(12) United States Patent
Gruhlke et al.

(10) Patent No.: US 7,215,453 B2
(45) Date of Patent: May 8, 2007

(54) OPTICAL SYSTEM HAVING EXTENDED ANGULAR SCAN RANGE

(75) Inventors: Russell W. Gruhlke, Fort Collins, CO (US); Farid Matta, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 10 days.

(21) Appl. No.: 11/021,536

(22) Filed: Dec. 23, 2004

(65) Prior Publication Data

US 2006/0139714 A1 Jun. 29, 2006

(51) Int. Cl.
*G02B 26/08* (2006.01)

(52) U.S. Cl. ...................................................... 359/204

(58) Field of Classification Search ................ 359/204, 359/196, 198, 205, 206, 212, 214–226

See application file for complete search history.

(56) References Cited

U.S. PATENT DOCUMENTS

| | | | |
|---|---|---|---|
| 6,121,983 A | 9/2000 | Fork et al. | |
| 7,068,296 B2 * | 6/2006 | Hayashi et al. | 347/243 |
| 2003/0063182 A1 | 4/2003 | Ishihara | |
| 2003/0072066 A1 * | 4/2003 | Hayashi et al. | 359/201 |
| 2003/0085849 A1 * | 5/2003 | Grabert | 345/30 |
| 2003/0179427 A1 * | 9/2003 | Lewis et al. | 359/204 |
| 2004/0027449 A1 | 2/2004 | Turner et al. | |

FOREIGN PATENT DOCUMENTS

| | | |
|---|---|---|
| EP | 5 541 460 A2 | 10/1992 |
| JP | 10-206773 A | 8/1998 |

* cited by examiner

*Primary Examiner*—Euncha P. Cherry

(57) ABSTRACT

System and method for scanning light across a light-receiving surface. A system for scanning light across a light-receiving surface to project a scanned line on the light-receiving surface has a light beam generator for generating a plurality of light beams. A scanning mechanism simultaneously scans each light beam of the plurality of light beams across the light-receiving surface to project a different portion of the scanned line on the light-receiving surface. The scanning system can be utilized in a compact laser printer capable of printing at a high rate, and in other scanning applications.

15 Claims, 5 Drawing Sheets

OPTICAL SYSTEM HAVING EXTENDED ANGULAR SCAN RANGE

DESCRIPTION OF RELATED ART

Laser printers transform electronically stored information into a "hardcopy" form that enables visual inspection and physical storage of the information. Current laser printers are capable of printing at a rate of about 16,000 lines per minute. Efforts are underway, however, to develop a "next generation" laser printer that is capable of printing at a rate of 32,000 lines per minute or more.

Current laser printer technology is based on a laser printer engine that includes an edge emitting laser diode, a rotating mirror and refractive lenses. The rotating mirror scans a reflected laser beam across the width of a revolving drum. The laser beam alters the electrical charge on the drum surface wherever it strikes the surface. The drum is then passed through a toner reservoir so that toner is picked up by the charged portions on the drum surface, and the toner is then transferred from the drum to a sheet of paper by a combination of heat and pressure. By controlling when the laser is turned on and off during a scanning operation, electronically stored information can be converted to a hardcopy form. The speed at which the mirror can be rotated, and, accordingly, the print rate of the laser printer, is limited by several factors including mechanical stability and safety.

A MEMS (Micro-Electro-Mechanical System) based mirror can, because of its miniature size, oscillate back and forth at a high rotational velocity. A MEMS mirror is, in fact, capable of rotating at a sufficiently high velocity to enable the printing of 32,000 lines per minute in a laser printer if the mirror is scanned through an angular scan range of no more than about 20 degrees. At an angular scan range of 20 degrees, however, it would be necessary to position the rotating drum of the laser printer many feet from the MEMS mirror in order to be able to scan a laser beam across the full width of the rotating drum. In order to provide a compact laser printer design, a larger angular scan range, for example, about 60 degrees is needed.

SUMMARY OF THE INVENTION

In accordance with the invention, a system and method for scanning light across a light-receiving surface is provided. A system for scanning light across a light-receiving surface to project a scanned line on the light-receiving surface has a light beam generator for generating a plurality of light beams. A scanning mechanism simultaneously scans each light beam of the plurality of light beams across the light-receiving surface to project a different portion of the scanned line on the light-receiving surface. The scanning system can be utilized in a compact laser printer capable of printing at a high rate, and in other scanning applications.

BRIEF DESCRIPTION OF THE DRAWINGS

Furthermore, the invention provides embodiments and other features and advantages in addition to or in lieu of those discussed above. Many of these features and advantages are apparent from the description below with reference to the following drawings.

DETAILED DESCRIPTION OF THE EXEMPLARY EMBODIMENTS OF THE INVENTION

Embodiments in accordance with the invention provide an optical scanning system and method for scanning light across a light-receiving surface to project a scanned line on the light-receiving surface.

Figure 1:
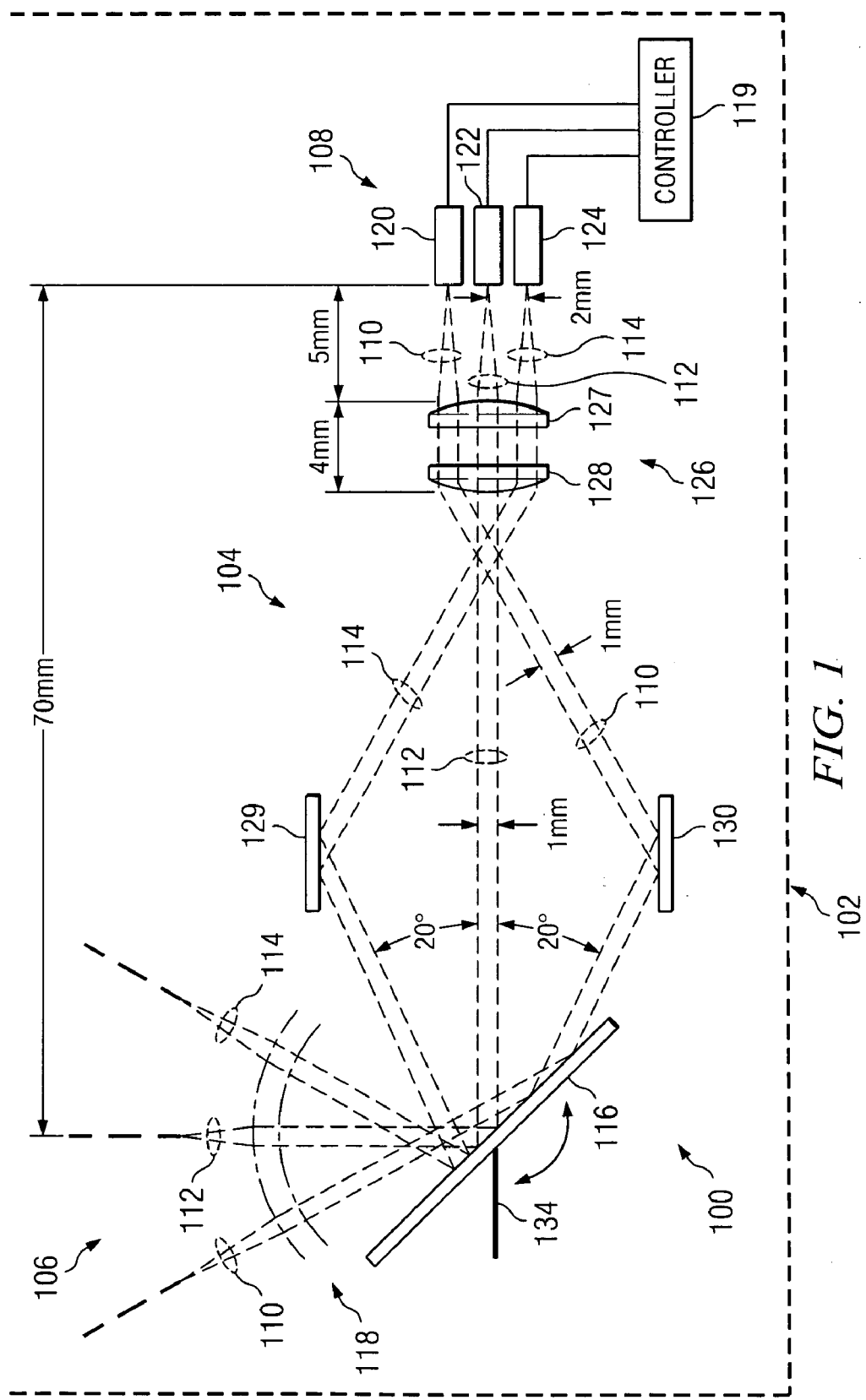
FIG. 1 schematically illustrates an optical scanning system according to an exemplary embodiment in accordance with the invention.

FIG. 1 schematically illustrates an optical scanning system according to an exemplary embodiment in accordance with the invention. The optical scanning system is generally designated by reference number 100, and in the exemplary embodiment described herein, comprises a laser print engine for a laser printer schematically illustrated at 102. It should be understood, however, that an optical scanning system in accordance with the invention is not limited to use in a laser printer, but can also be used in other optical scanning applications.

Optical scanning system 100 includes source assembly 104 and focusing assembly 106. Source assembly 104 includes light beam generator 108 for generating a plurality of light beams 110, 112 and 114, scanning mechanism 116, and optics necessary to relay light beams 110, 112 and 114 from light beam generator 108 to scanning mechanism 116. Focusing assembly 106 includes light focusing structure 118 for focusing light and beams 110, 112 and 114 redirected by scanning mechanism 116 onto a surface of a rotating drum of laser printer 102 (not shown in FIG. 1). As is understood by those skilled in the art, the electrical charge on the drum surface is altered wherever light strikes the surface. The drum is then passed through a toner reservoir so that toner is picked up by the charged portions on the drum surface, and the toner is then transferred from the drum to a sheet of paper through a combination of heat and pressure. By controlling when the light is turned on and off, for example, by controller 119 connected to light beam generator 108, electronically stored information can be converted to a hardcopy form.

Light beam generator 108 comprises a plurality of light sources 120, 122 and 124 for generating the plurality of light beams 110, 112 and 114, respectively. Light sources 120, 122 and 124 preferably comprise Vertical Cavity Surface Emitting Lasers (VCSELs). A VCSEL is a semiconductor microlaser that emits a light beam having a circular cross-section and low divergence, and thus reduces the need for corrective optics. It should be understood, however, that light sources 120, 122 and 124 can also comprise edge emitting laser diodes or other light sources, and it is not intended to limit the invention to any particular type of light source. It should also be understood that although light beam generator 108 generates three light beams 110, 112 and 114, in other embodiments in accordance with the invention, light beam generator 108 can generate a different plurality of light beams.

The optics for relaying light beams 110, 112 and 114 from light beam generator 108 to scanning mechanism 116 includes lens 126 having refractive surfaces 127 and 128, and stationary planar mirrors 129 and 130. At least one of refractive surfaces 127 and 128 is an aspheric surface to correct for spherical aberration. In the exemplary embodiment in accordance with the invention illustrated in FIG. 1, surface 127 is an aspheric surface having a diameter of 7.0 mm, a Radius of Curvature of 5.75 mm and aspheric coefficients D=20E-4 and E=12E-6. Refractive surface 128 is a spherical surface having a diameter of 7.0 mm and a Radius of Curvature of 5.75 mm. Although surfaces 127 and 128 are opposed surfaces of a single lens 126, the surfaces can also be provided on separate optical elements, if desired.

Scanning mechanism 116 preferably comprises a light reflecting member for receiving light beams 110, 112 and 114 relayed from light beam generator 108, and for reflecting the light beams onto the surface of the rotating drum in laser printer 102. In the exemplary embodiment in accordance with the invention described herein, scanning mechanism 116 comprises a MEMS (Micro-Electro-Mechanical System) based mirror. A MEMS mirror, because of its miniature size (for example, about 2 mm$^2$) is capable of being oscillated back and forth at a high rotational velocity, and, accordingly, is capable of rapidly scanning reflected light back and forth across the surface of the rotating drum to provide a laser printer having a high printing rate.

Lens 126 collimates the light emitted from each VCSEL 120, 122 and 124. VSCEL 122 is on optical axis 134 of lens 126 and provides collimated light beam 112 that propagates along optical axis 134 towards the center of MEMS mirror 116. VCSELs 120 and 124 are placed on opposite sides of VCSEL 112 and symmetrically off of optical axis 134 of lens 126 and provide collimated light beams 110 and 114, respectively, that propagate at an angle with respect to optical axis 134. Beams 110 and 114 strike stationary planar mirrors 130 and 129 respectively that are positioned and oriented to reflect the light beams toward the center of MEMS mirror 116. Thus, all three collimated light beams 110, 112 and 114 are coincident on MEMS mirror 116 but have propagation angles that differ from one another.

In the exemplary embodiment in accordance with the invention illustrated in FIG. 1, VCSELs 120 and 124 are positioned on opposite sides of VCSEL 122 and are spaced from VCSEL 122 by a distance of about 2 mm. The distance from VCSEL 122 to the vertex of aspheric surface 127 is about 5 mm, the distance from the vertex of aspheric surface 127 to the vertex of spherical surface 128 is about 4 mm, and the distance from VCSEL 122 to the center of MEMS mirror 116 is about 70 mm. Collimated light beams 110, 112 and 114 each have a diameter of about 1 mm. With a scanning optical system having a geometry as described above, collimated beams 110 and 114 impinge on MEMS mirror 116 at an angle of about 20 degrees relative to collimated beam 112 as illustrated in FIG. 1.

Figure 2:
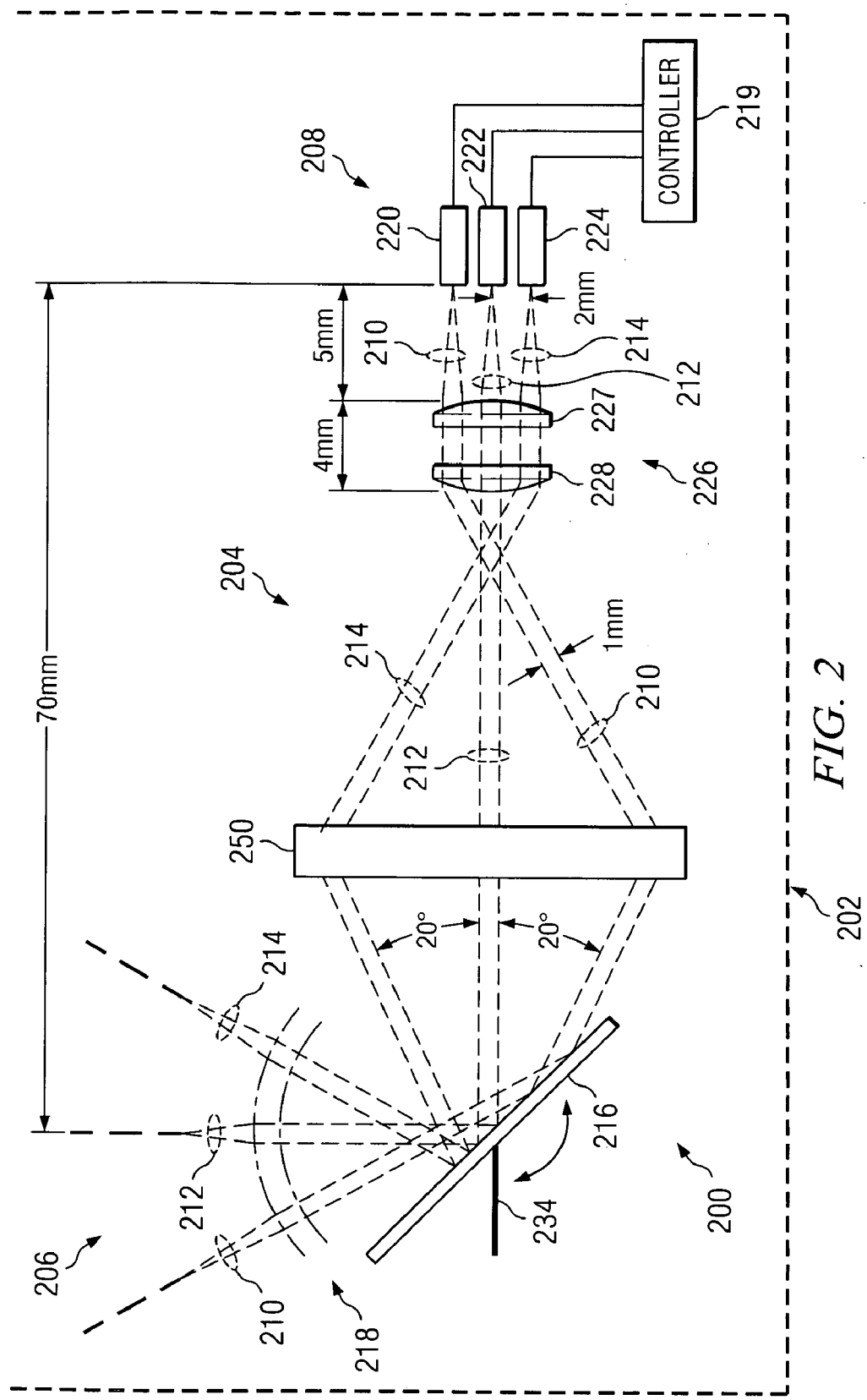
FIG. 2 schematically illustrates an optical scanning system according to a further exemplary embodiment in accordance with the invention.

FIG. 2 schematically illustrates an optical scanning system according to a further exemplary embodiment in accordance with the invention. The optical scanning system is designated by reference number 200, and is generally similar to optical scanning system 100 illustrated in FIG. 1 such that corresponding components are identified by corresponding reference numbers. Optical scanning system 200 differs from optical scanning system 100 in that turning mirrors 129 and 130 in optical system 100 have been replaced by diffractive element 250 to direct light beams 210, 212 and 214 onto the center of MEMS mirror 216. Diffractive element 250 can, for example, be a flat piece of silica having concentric grooves to relay light beams 210, 212 and 214 from light beam generator 208 to impinge upon MEMS mirror 216 in the same manner as in the system illustrated in FIG. 1.

Figure 3:
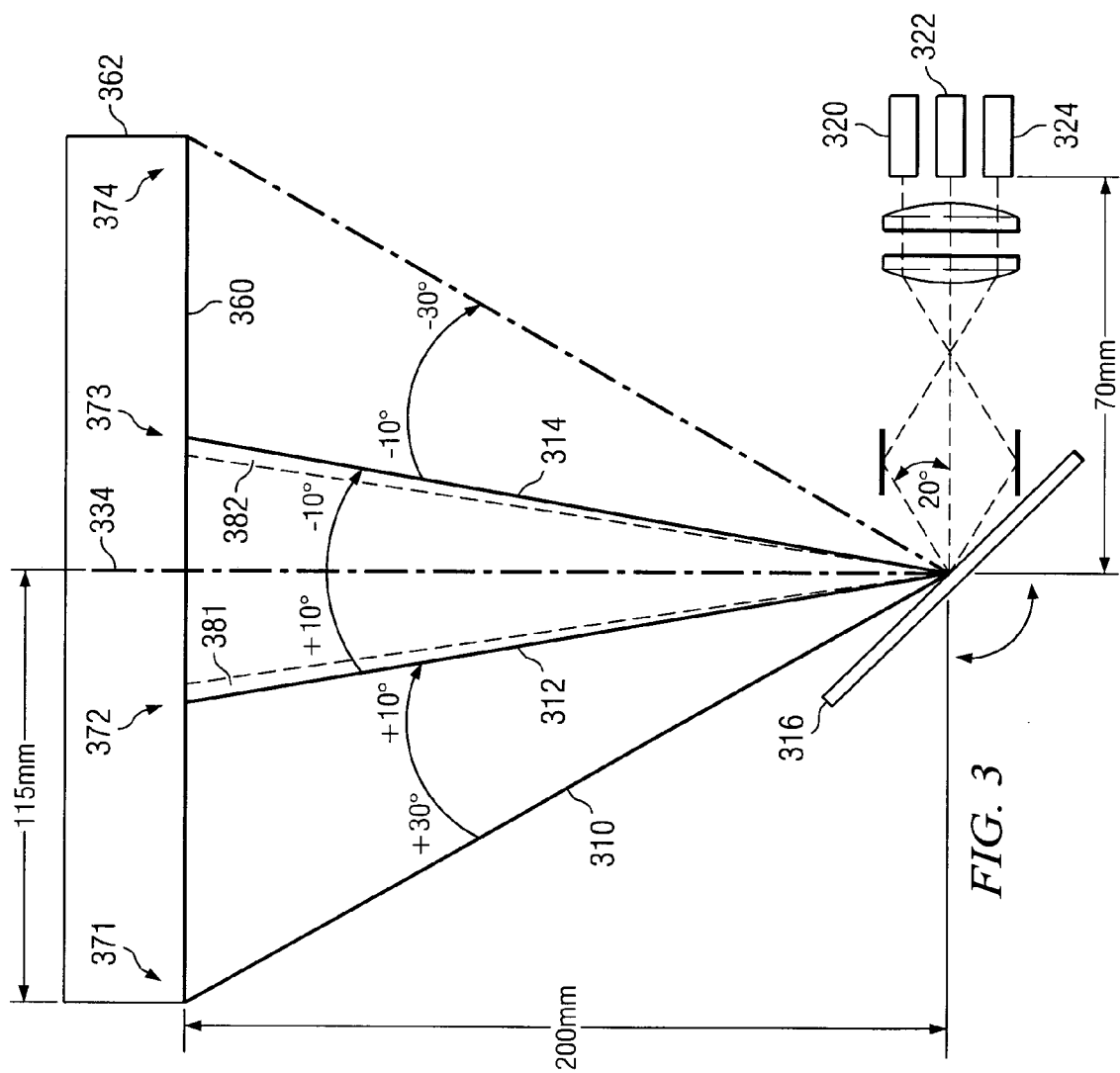
FIG. 3 is a diagram that illustrates the angular scan range of the optical scanning systems illustrated in FIGS. 1 and 2.

In order to achieve the high rotational velocities required to provide a laser printer having a printing rate of 32,000 lines per minute, the rotation range of MEMS mirror 116 or 216 is about 10 degrees (from about +5 degrees to about −5 degrees relative to optical axis 134 or 234). Reflection doubles the scan range from about 10 degrees to about 20 degrees such that MEMS mirror 116 or 216 scans each light beam through a scan angle of about 20 degrees. FIG. 3 is a diagram that illustrates the angular scan range of optical scanning systems 100 and 200 illustrated in FIGS. 1 and 2, respectively.

As shown in FIG. 3, a single rotation of MEMS mirror 316 between about +5 degrees and about −5 degrees relative to optical axis 334 sweeps each of the three light beams 310, 312 and 314 over an angular range of about 20 degrees. In particular, MEMS mirror 316 scans light beam 310 across surface 360 of rotating drum 362 from position 371 at one end of drum 362 to position 372. At the same time, MEMS mirror 316 sweeps light beam 312 across the drum surface from position 372 to position 373, and sweeps light beam 314 across the drum surface from position 373 to position 374 at the opposite end of drum 362. MEMS mirror 316 thus scans each light beam along a scan length equal to approximately one-third the width of drum 362. In addition, the three beams are swept across angular ranges that are adjacent one another to provide a total angular scan range of the three beams of about 60 degrees, from about +30 degrees to about −30 degrees relative to optical axis 334. As also shown in FIG. 3, if surface 360 of rotating drum 362 is spaced a distance of about 200 mm from the center of MEMS mirror 316, the three beams will scan across a length of about 230 mm equal to the width of drum 362 in a typical laser printer.

As indicated previously, a MEMS mirror is capable of rotating at a sufficiently high velocity to enable the printing of 32,000 lines per minute in a laser printer if the mirror is scanned through an angular scan range of no more than about 10 degrees. According to the exemplary embodiments in accordance with the present invention illustrated in FIGS. 1 and 2, each light beam is scanned through a scan range of only about 20 degrees, and thus optical system 100 or 200 is capable of scanning over a full scan range of about 60 degrees so as to be able to print at a rate of 32,000 lines per minute while maintaining a compact laser printer design.

Figure 4A:
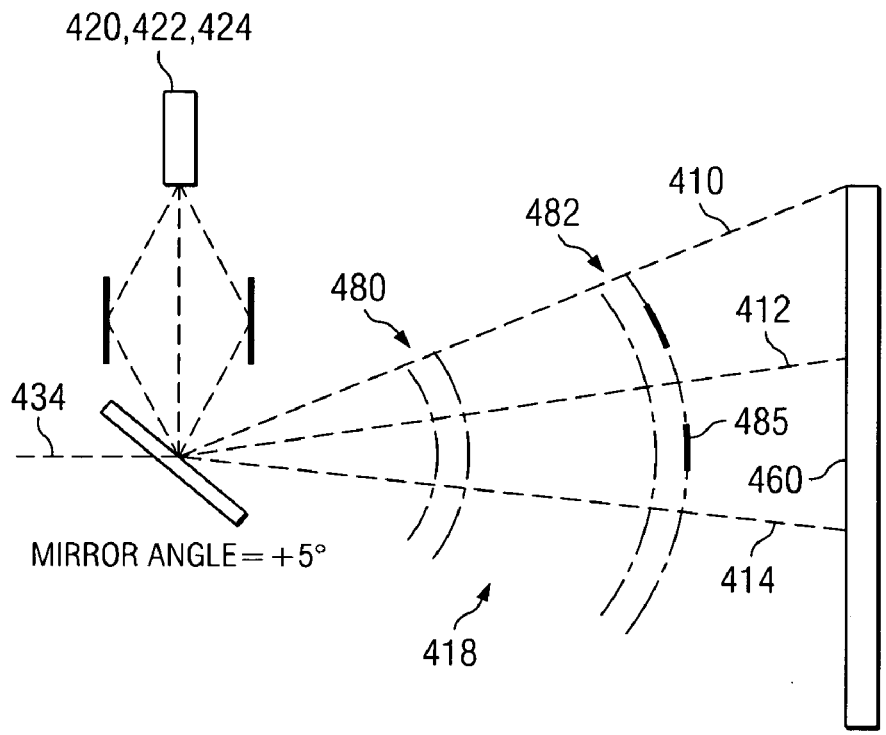
FIGS. 4A, 4B and 4C are diagrams that illustrate the operation of the optical scanning systems illustrated in FIGS. 1 and 2.
Figure 4B:
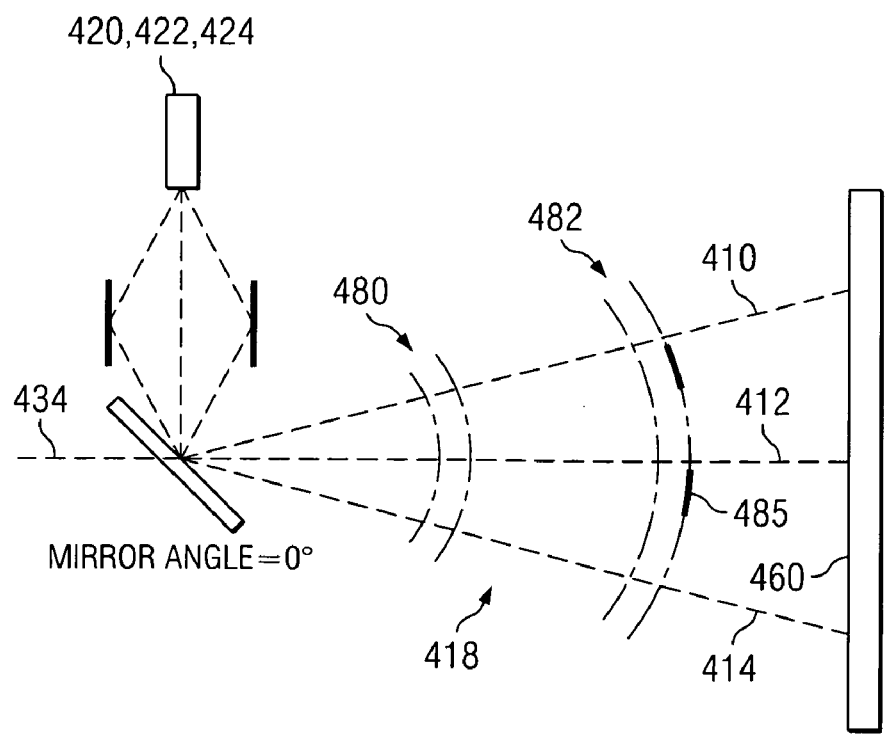
Figure 4C:
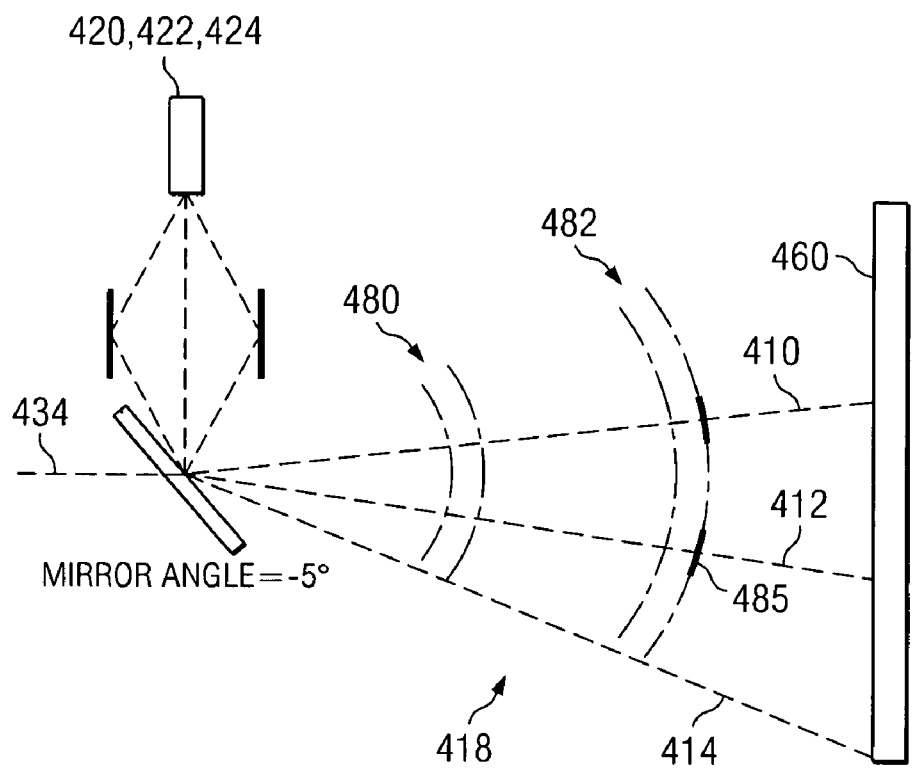

FIGS. 4A, 4B and 4C are diagrams that illustrate the operation of the optical scanning systems illustrated in FIGS. 1 and 2. In particular, FIG. 4A illustrates light beams 410, 412 and 414 when MEMS mirror 434 is at an angle of about +5 degrees during a scanning operation, FIG. 4B illustrates light beams 410, 412 and 414 when MEMS mirror 434 is at an angle of about 0 degrees, and FIG. 4C illustrates light beams 410, 412 and 414 when MEMS mirror 434 is at an angle of about −5 degrees. As shown, during a scanning operation, light beams 410, 412 and 414 will each provide a portion of a scanned line on drum surface 460 such that the three light beams together will provide a complete scanned line extending from one end to the opposite end of drum surface 460.

FIGS. 4A, 4B and 4C also illustrate light focusing structure 418 corresponding to light focusing structure 118 and 218 in FIGS. 1 and 2, respectively. Light focusing structure includes two focusing refractive lenses 480 and 482 which function to focus light beams reflected off MEMS mirror 416 onto rotating drum surface 460. The lenses preferably comprise fΘ lenses to correct for field of curvature inasmuch as light beams 410, 412 and 414 travel different distances to the drum surface. The fΘ lenses correct the light beams so that they are all focused on drum surface 460 notwithstanding that they travel different distances.

Referring back to FIG. 3, there may be "stitching" issues at locations 372 and 373 where one beam ends a scan and the adjacent beam begins a scan. In particular, adjacent light beams may not line up exactly at locations 372 and 373 during a scanning operation such that the beams may overlap somewhat or leave a slight gap along the scanned line on the drum surface.

According to exemplary embodiments in accordance with the invention, stitching issues are obviated by purposely causing adjacent beams to overlap in stitching regions between adjacent beams. In particular, as shown in FIG. 3, adjacent beams 310 and 312 are purposely caused to overlap in stitching region 381, and adjacent beams 312 and 314 are purposely caused to overlap in stitching region 382. Stitching regions 381 and 382 preferably have a length that is sufficient to encompass any overlap or gap that would otherwise be likely to occur during a scanning operation. In an exemplary embodiment in accordance with the invention wherein a laser dot is 50 microns, stitching regions having a length of about 10 laser dots would be sufficient. This can be achieved by causing adjacent beams to overlap by about 0.1 degree which will result in stitching regions on drum surface 360 having a length of less than one-half millimeter for a laser printer having dimensions described herein and illustrated in FIGS. 1–3.

It is desirable to adjust the combined power of overlapped beams in stitching regions 381 and 382 so that the combined effect of the overlapped beams produces paper markings that are substantially the same as paper markings produced by a single beam in non-stitching regions. According to exemplary embodiments in accordance with the invention, adjustment of the combined power of overlapped beams can be accomplished electronically or optically. Optical adjustment can be accomplished by applying an optical coating to final focusing lens 482 (FIG. 4) so that the flux of light refracted through the lens and striking a stitching region is appropriately reduced. The applied coating, schematically illustrated at 485 in FIG. 4, should vary continuously across a small portion of the lens to reduce diffractive effects.

Adjustment of the combined power of overlapped beams can be accomplished electronically by reducing light beam source power when beams propagate toward the stitching regions. According to an exemplary embodiment in accordance with the invention, adjustment of the combined power of overlapped beams can be accomplished by calibrating the laser printer such that controller 119 or 219 turns off lasers 120 and 124 or lasers 220 and 224 on either side of axially aligned laser 122 or 222 while leaving the axially aligned laser 122 or 222 at full power when the beams overlap in the stitching regions. Alternatively, lasers 120 and 124 or lasers 220 and 224 can be turned off while leaving axially aligned laser 122 or 222 at full power when the beams overlap in the stitching regions. Yet other techniques can also be used to adjust the combined power of overlapped beams in stitching regions without departing from the scope of the invention.

Figure 5:
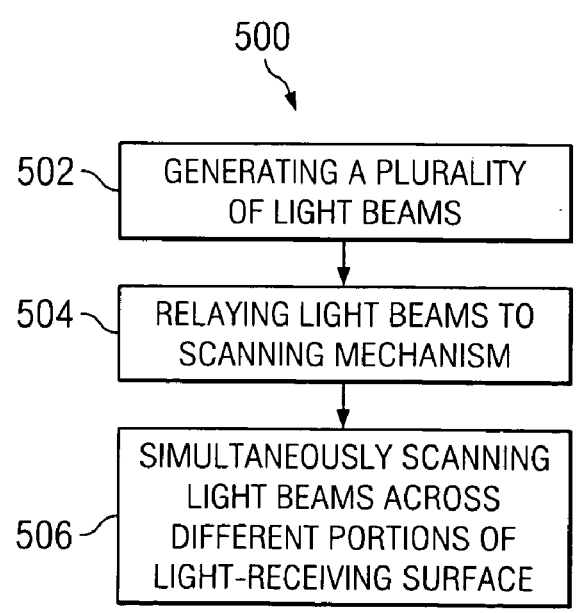
FIG. 5 is a flowchart that illustrates a method for scanning light across a light-receiving surface according to a further exemplary embodiment in accordance with the invention.

FIG. 5 is a flowchart that illustrates a method for scanning light across a light-receiving surface according to a further exemplary embodiment in accordance with the invention. The method is generally designated by reference number 500 and begins by generating a plurality of light beams (Step 502). The plurality of light beams are relayed to a scanning mechanism (Step 504), and are simultaneously scanned across different portions of a light receiving surface to project different portions of a scanned line on the light-receiving surface (Step 506).

While what has been described constitute exemplary embodiments in accordance with the invention, it should be recognized that the invention can be varied in numerous ways without departing from the scope thereof. Because embodiments in accordance with the invention can be varied in numerous ways, it should be understood that the invention should be limited only insofar as is required by the scope of the following claims.

We claim:

1. A method for scanning light across a surface of a rotating drum in a printer to project a scanned line on the surface, comprising:

generating at least three light beams;

relaying each of the at least three generated light beams to impinge on a Micro-Electro-Mechanical System scanning mirror at different propagation angles; and simultaneously scanning each light beam of the at least three light beams across the surface of the drum in alignment with one another with the Micro-Electro-Mechanical System scanning mirror to project a different portion of the scanned line on the surface.

2. The method according to claim 1, and further including correcting misalignment between adjacent light beams during a scanning operation.

3. The method according claim 1, wherein the at least three light beams comprises three light beams.

4. A printer, comprising:

a drum; and a system for scanning light across a surface of the drum to project a scanned line on the surface of the drum, the system comprising:

a light beam generator for generating at least three light beams;

a Micro-Electro-Mechanical System scanning mirror for simultaneously scanning each light beam of the at least three light beams across a surface of the drum in alignment with one another to project a different portion of the scanned line on the surface of the drum; and relay optics for relaying each of the at least three light beams from the light beam generator to impinge on the Micro-Electro-Mechanical System scanning mirror at a different propagation angle.

5. The printer according to claim 4, wherein the optics for relaying each of the at least three light beams to impinge on the Micro-Electro-Mechanical System scanning mirror at a different propagation angle includes a plurality of stationary mirrors.

6. The printer according to claim 4, wherein the optics for relaying each of the at least three light beams to impinge on the Micro-Electro-Mechanical System scanning mirror at a different propagation angle includes a diffractive element.

7. The printer according to claim 4, and further including light focusing structure for focusing the at least three light beams on the light-receiving surface, wherein the light focusing structure includes at least one fΘ lens.

8. The printer according to claim 4, and further including a stitching mechanism for correcting misalignment between adjacent light beams during a scanning operation, wherein the stitching mechanism comprises a mechanism for causing light beams to overlap in stitching regions between adjacent light beams.

9. The printer according to claim 8, wherein the stitching mechanism further comprises a mechanism for adjusting a combined power of adjacent light beams in stitching regions.

10. The printer according to claim 9, wherein the mechanism for adjusting a combined power of adjacent light beams in stitching regions comprises one of an optical mechanism and an electronic mechanism.

11. The printer according to claim 4, wherein the at least three light beams comprises three light beams, each light beam providing approximately one-third of the scanned line.

12. The printer according to claim 11, wherein the three light beams comprise a first light beam on an optical axis of the system for scanning light across a surface of the drum to project a scanned line on the surface of the drum, and second and third light beams on opposite sides of the first light beam.

13. The printer according to claim 4, wherein the Micro-Electro-Mechanical System scanning mirror prints about 32,000 lines per minute on the drum surface.

14. The printer according to claim 4, wherein the light beam generator comprises at least three lasers.

15. The printer according to claim 14, wherein the at least three lasers comprises at least three Vertical Cavity Surface Emitting Lasers.

* * * * *